(12) United States Patent
Gushman et al.

(10) Patent No.: US 8,695,410 B2
(45) Date of Patent: Apr. 15, 2014

(54) SYSTEM TO ENHANCE FUEL FLOW MEASUREMENT ACCURACY

(75) Inventors: Richard W. Gushman, Rochester Hills, MI (US); Charles Thomas Sullivan, Lexington, NC (US); David J. Gunnels, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 183 days.

(21) Appl. No.: 13/432,866

(22) Filed: Mar. 28, 2012

(65) Prior Publication Data

US 2013/0255364 A1 Oct. 3, 2013

(51) Int. Cl.
*G01M 15/04* (2006.01)
(52) U.S. Cl.
USPC ...................................... 73/114.42
(58) Field of Classification Search
USPC ............... 73/114.38, 114.42, 114.48, 114.52, 73/114.53, 118.01, 118.02
See application file for complete search history.

(56) References Cited

U.S. PATENT DOCUMENTS

| 4,498,334 | A * | 2/1985 | Riesenberg | 73/114.52 |
| 6,675,641 | B2 * | 1/2004 | Gehner et al. | 73/114.42 |
| 2002/0194902 | A1 * | 12/2002 | Gehner et al. | 73/118.1 |

* cited by examiner

*Primary Examiner* — Eric S McCall
(74) *Attorney, Agent, or Firm* — Cantor Colburn LLP

(57) ABSTRACT

A fuel flow measuring apparatus comprises a fuel conditioning cabinet, a fuel supply delivered through a fuel supply line, a fuel measurement cabinet, a fuel transfer line to transfer fuel from the fuel conditioning cabinet to the fuel measurement cabinet, a fuel delivery line extending between the fuel measurement cabinet and the internal combustion engine and to deliver fuel thereto, a first fuel return loop extending from the fuel delivery line to the fuel measurement cabinet, a second fuel return loop extending between the fuel measurement cabinet and the fuel conditioning cabinet and an intermediate cooling system comprising an intermediate cooling tank containing an intermediate coolant, an intermediate coolant line in serial thermodynamic communication with the first fuel return loop and the second fuel return loop to thermally connect the fuel flowing through both of the fuel conditioning cabinet and the fuel measurement cabinet to define an isothermic fuel stability.

16 Claims, 1 Drawing Sheet

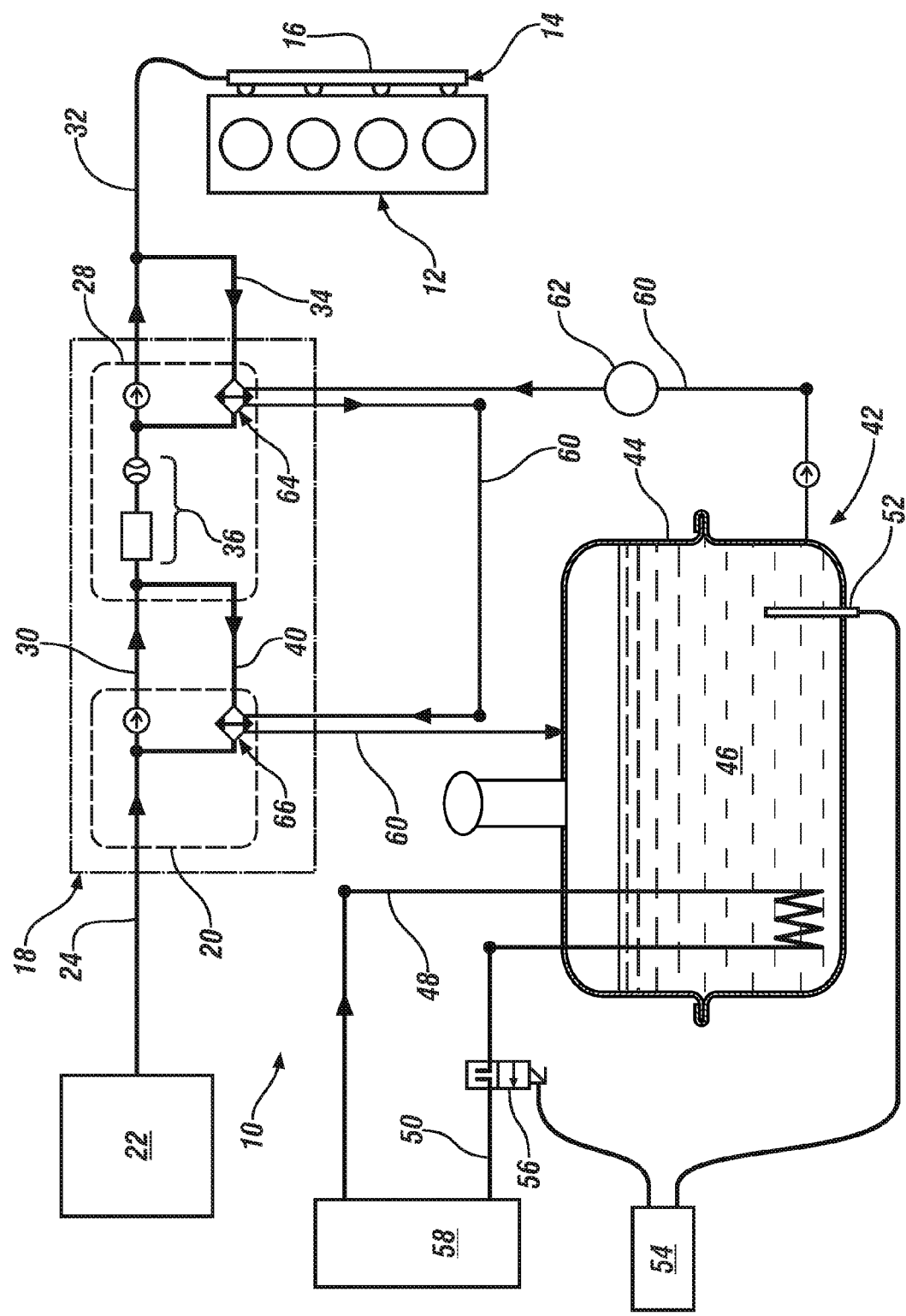

SYSTEM TO ENHANCE FUEL FLOW MEASUREMENT ACCURACY

FIELD OF THE INVENTION

Exemplary embodiments of the invention relate to systems for measuring mass fuel flow and, more particularly, to a laboratory's ability to accurately measure fuel mass flow without requiring that the test engine operate at steady state conditions until the fuel system thermal stability is established.

BACKGROUND

With increased governmental and consumer focus on motor vehicle fuel economy, the ability of manufacturers to develop fuel efficient engines has become of paramount importance. As part of this engineering effort is the ability to accurately measure the fuel economy of such engines as errors can be costly; on either the high or the low side of measurement.

In engine test cells, the density of fuel can change 0.1% per degree Celsius. Changes of fuel density during a test measurement introduce errors in mass flow calculations. Testing has shown a definite correlation between fuel temperature stability and fuel mass flow measurement accuracy. As a result, isothermal test cell fuel systems desirably enhance accuracy substantially. Jacketed fuel lines and large in-cell fuel reservoirs are one alternative but require significant test cell space which is generally not available. Some laboratories may attempt to attain stability through long stabilization times. This effectively compromises the ability to acquire accurate fuel flow measurements during transient conditions and adversely affects test cell productivity.

SUMMARY

In an exemplary embodiment a fuel flow measuring apparatus for an internal combustion engine comprises a fuel conditioning cabinet, a fuel supply configured to deliver fuel to the fuel conditioning cabinet through a fuel supply line, a fuel measurement cabinet (or subsystem), a fuel transfer line configured to transfer fuel from the fuel conditioning cabinet to the fuel measurement cabinet (or subsystem), a fuel delivery line extending between the fuel measurement cabinet (or subsystem) and the internal combustion engine and configured to deliver fuel thereto, a first fuel return loop extending from the fuel delivery line to the fuel measurement cabinet (or subsystem), a second fuel return loop extending between the fuel measurement cabinet (or subsystem) and the fuel conditioning cabinet and an intermediate cooling system comprising an intermediate cooling tank containing an intermediate coolant therein, an intermediate coolant line in serial thermodynamic communication with the first fuel return loop and the second fuel return loop to thereby thermally connect the fuel flowing through both of the fuel conditioning cabinet and the fuel measurement cabinet (or subsystem) to define an isothermic fuel stability therebetween.

The above features and advantages, and other features and advantages of the invention are readily apparent from the following detailed description of the invention when taken in connection with the accompanying drawing.

BRIEF DESCRIPTION OF THE DRAWINGS

Other objects, features, advantages and details appear, by way of example only, in the following detailed description of the embodiments, the detailed description referring to the drawing in which the FIGURE is a schematic view of portions of an engine test cell fuel system embodying features of the invention.

DESCRIPTION OF THE EMBODIMENTS

The following description is merely exemplary in nature and is not intended to limit the present disclosure, its applications or uses. Referring to the FIGURE, a test cell 10 for testing various performance characteristics of an internal combustion engine 12 is illustrated. In the exemplary embodiment illustrated, the internal combustion engine is a 4-cylinder engine having a dead-headed or non-recirculating fuel system 14, in which fuel entering a fuel rail does not return to the fuel system. Other types of fuel systems are contemplated.

A fuel flow measuring apparatus 18 includes a fuel conditioning cabinet 20. In an exemplary embodiment the fuel conditioning cabinet 20 may include one or more fuel filters, fuel pumps and fuel pre-conditioners among other items (not shown) depending on the particular testing being conducted on the internal combustion engine 12. Fuel enters the fuel conditioning cabinet 20 from a remote fuel supply 22 through fuel supply line 24. In an exemplary embodiment, a fuel measurement cabinet (or subsystem) 28 may include one or more fuel flow measurement devices, fuel pressure controls, positive displacement pumps, variable displacement pumps, density sensors and fuel flow transducers among other items (not shown); again depending on the particular testing being conducted on the internal combustion engine 12. Fuel enters the fuel measurement cabinet (or subsystem) 28 from the fuel conditioning cabinet 20 through fuel transfer line 30. The purpose of fuel conditioning cabinet and fuel measurement cabinet (or subsystem) 20 and 28 respectively is to precisely condition the fuel passing therethrough (pressure, temperature, etc.) for introduction to the internal combustion engine 12 during testing. In another embodiment of the invention it is contemplated that the fuel flow measuring apparatus may comprise a single cabinet which would then be denominated simply as 18 in the FIGURE and could contain all of the equipment already indicated as resident in the individual cabinets 20, 28. A fuel delivery line 32 extends between the metering portion of the fuel measurement cabinet (or subsystem) 28 and the fuel rail 16 of the non-recirculating fuel system 14 for delivery of the precisely conditioned fuel thereto and to the engine 12.

As indicated, one important aspect of the fuel condition is the temperature. Maintaining the fuel at a constant temperature during its residence time in both cabinets 20 and 28 as well as in fuel transfer line 30 is of significant importance if accurate measurements of engine fuel consumption are to be gathered. As such a first fuel return loop 34 is provided from the fuel delivery line 32 to the fuel measurement cabinet (or subsystem) 28. In an exemplary embodiment, the fuel is delivered downstream of the metering portion 36 of the fuel line in the fuel measurement cabinet (or subsystem) 28 and, as such, in an exemplary embodiment, to an upstream portion of the fuel transfer line 32. As a result of the first fuel return loop 34, fuel is not allowed to become stagnant in the fuel delivery line 32, due to the non-recirculating fuel system 14, which could result in an undesirable increase in fuel temperature due to high ambient temperatures in the test cell 10. In an exemplary embodiment, a second fuel return loop 40 is provided between the fuel measurement cabinet (or subsystem) 28 and the fuel conditioning cabinet 20. The fuel return loop 40 extends from a location upstream of the metering portion 36 in the fuel measurement cabinet (or subsystem) 28 and returns fuel to the fuel supply line 24 in the fuel conditioning cabinet 20.

In an exemplary embodiment, an intermediate cooling system 42 includes an intermediate coolant tank 44 which may be resident in the test cell 10. The intermediate coolant tank 44 is maintained at a predetermined temperature through the use of a facility coolant supply 58 through thermodynamic transfer supply and return lines 48, 50, respectively. In one embodiment, a desired temperature of the intermediate coolant 46 in the intermediate coolant tank may be approximately 22 degrees Celsius. A temperature sensor 52 in signal communication with a controller 54 allows the controller to actuate a solenoid or other suitable valve member 56 to control the quantity of coolant/heating medium 58 flowing through the thermodynamic transfer supply and return lines 48, 50, to maintain the intermediate coolant 46 at the desired temperature. The intermediate coolant 46 is circulated through intermediate coolant lines 60 via intermediate coolant pump 62 in fluid communication therewith. The intermediate coolant lines 60 serially deliver intermediate coolant 46 to a first heat exchanger 64 disposed in thermodynamic communication with first fuel return loop 34 and to a second heat exchanger 66 disposed in thermodynamic communication with second fuel return loop 40 thereby thermally connecting the fuel flowing through both fuel conditioning cabinet and fuel measurement cabinet (or subsystem) 20 and 28, respectively as well as fuel being returned from the non-recirculating fuel system 14 through first fuel return loop 34. Following flow through the second heat exchanger 66, intermediate coolant is returned to the intermediate coolant tank 44.

The exemplary system described herein connects the circulating volumes (volumes in fuel conditioning cabinet and 20, 28, tubes, lines, fittings and associates equipment) by circulating a secondary coolant (i.e. intermediate coolant 46) between heat exchangers 64, 66 in each of these volumes. The intermediate cooling system 42 is designed to provide thermal stability to these fuel volumes (i.e. isothermal fuel stability) by means of a significant coolant mass and shared heat exchangers with a control system. In an exemplary embodiment, the temperature of the intermediate coolant 46 is controlled, via the controller 54, to a temperature close to ambient temperature. By stabilizing the fuel temperature in the circulating volumes, the fuel density changes during a test measurement are minimized.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed but that the invention will include all embodiments falling within the scope of the present application.

What is claimed is:

1. A fuel flow measuring apparatus for an internal combustion engine comprising:
   a fuel conditioning cabinet;
   a fuel supply configured to deliver fuel to the fuel conditioning cabinet through a fuel supply line;
   a fuel measurement cabinet (or subsystem);
   a fuel transfer line configured to transfer fuel from the fuel conditioning cabinet to the fuel measurement cabinet (or subsystem);
   a fuel delivery line extending between the fuel measurement cabinet (or subsystem) and the internal combustion engine and configured to deliver fuel thereto;
   a first fuel return loop extending from the fuel delivery line to the fuel measurement cabinet (or subsystem);
   a second fuel return loop extending between the fuel measurement cabinet (or subsystem) and the fuel conditioning cabinet; and
   an intermediate cooling system comprising:
   an intermediate cooling tank containing an intermediate coolant therein;
   an intermediate coolant line in serial thermodynamic communication with the first fuel return loop and the second fuel return loop to thereby thermally connect the fuel flowing through both of the fuel conditioning cabinet and the fuel measurement cabinet (or subsystem) to define an isothermic fuel stability therebetween.

2. The fuel flow measuring apparatus of claim 1, further comprising a metering portion disposed in the fuel measurement cabinet (or subsystem) wherein the first fuel return loop delivers fuel to a location in the fuel measurement cabinet (or subsystem) downstream thereof.

3. The fuel flow measuring apparatus of claim 2, wherein the second fuel return loop extends from a location upstream of the metering portion disposed in the fuel measurement cabinet (or subsystem) and returns fuel to the fuel supply line in the fuel conditioning cabinet.

4. The fuel flow measuring apparatus of claim 1, further comprising:
   a first heat exchanger disposed in thermodynamic communication with the first fuel return loop and the intermediate coolant line; and
   a second heat exchanger disposed in thermodynamic communication with the second fuel return loop and the intermediate coolant line.

5. The fuel flow measuring apparatus of claim 1, further comprising a pump disposed in fluid communication with the intermediate coolant line.

6. A fuel flow measuring apparatus for an internal combustion engine comprising:
   a fuel conditioning cabinet;
   a fuel supply configured to deliver fuel to the fuel conditioning cabinet through a fuel supply line;
   a fuel delivery line extending between the fuel conditioning cabinet and the internal combustion engine and configured to deliver fuel thereto;
   a fuel return loop extending from the fuel delivery line to the fuel conditioning cabinet;
   an intermediate cooling system comprising:
   an intermediate cooling tank containing an intermediate coolant therein;
   an intermediate coolant line in thermodynamic communication with the fuel return loop to thereby thermally connect the fuel flowing through the fuel return loop and the fuel conditioning cabinet to define an isothermic fuel stability therebetween.

7. The fuel flow measuring apparatus of claim 6, further comprising a metering portion disposed in the fuel conditioning cabinet wherein the first fuel return loop delivers fuel to a location in the fuel conditioning cabinet downstream thereof.

8. The fuel flow measuring apparatus of claim 6, further comprising a heat exchanger disposed in thermodynamic communication with the fuel return loop and the intermediate coolant line.

9. The fuel flow measuring apparatus of claim 6, further comprising a pump disposed in fluid communication with the intermediate coolant line.

10. A test cell for an internal combustion engine having a fuel flow measuring apparatus comprising:
- a fuel conditioning cabinet;
- a fuel supply configured to deliver fuel to the fuel conditioning cabinet through a fuel supply line;
- a fuel measurement cabinet (or subsystem);
- a fuel transfer line configured to transfer fuel from the fuel conditioning cabinet to the fuel measurement cabinet (or subsystem);
- a fuel delivery line extending between the fuel measurement cabinet (or subsystem) and the internal combustion engine and configured to deliver fuel thereto;
- a first fuel return loop extending from the fuel delivery line to the fuel measurement cabinet (or subsystem);
- a second fuel return loop extending between the fuel measurement cabinet (or subsystem) and the fuel conditioning cabinet; and
- an intermediate cooling system comprising:
- a facility coolant supply;
- an intermediate cooling tank containing an intermediate coolant therein;
- an intermediate coolant line in serial thermodynamic communication with the first fuel return loop and the second fuel return loop to thereby thermally connect the fuel flowing through both of the fuel conditioning cabinet and the fuel measurement cabinet (or subsystem) to define an isothermic fuel stability therebetween.

11. The test cell of claim 10, further comprising a metering portion disposed in the fuel measurement cabinet (or subsystem) wherein the first fuel return loop delivers fuel to a location in the fuel measurement cabinet (or subsystem) downstream thereof.

12. The test cell of claim 11, wherein the second fuel return loop extends from a location upstream of the metering portion disposed in the fuel measurement cabinet (or subsystem) and returns fuel to the fuel supply line in the fuel conditioning cabinet.

13. The test cell of claim 10, further comprising:
- a first heat exchanger disposed in thermodynamic communication with the first fuel return loop and the intermediate coolant line; and
- a second heat exchanger disposed in thermodynamic communication with the second fuel return loop and the intermediate coolant line.

14. The test cell of claim 10, further comprising a pump disposed in fluid communication with the intermediate coolant line.

15. The test cell of claim 10, further comprising:
- thermodynamic transfer and return lines extending between the facility coolant supply and the intermediate cooling tank and in fluid communication with the intermediate coolant therein;
- a valve member in communication with the thermodynamic transfer and return lines;
- a temperature sensor in thermal communication with the intermediate coolant;
- a controller in signal communication with the valve member and the temperature sensor and operable based on signals form the temperature sensor operate the valve member to vary the flow of facility coolant through the thermodynamic transfer and return lines to maintain the temperature of the intermediate coolant at a desired temperature.

16. The test cell of claim 15, wherein the desired temperature is approximately 22 degrees Celsius.

* * * * *